United States Patent
Berke et al.

(10) Patent No.: US 8,484,399 B2
(45) Date of Patent: Jul. 9, 2013

(54) SYSTEM AND METHOD FOR CONFIGURING EXPANSION BUS LINKS TO GENERATE A DOUBLE-BANDWIDTH LINK SLOT

(75) Inventors: Stuart A. Berke, Austin, TX (US); Sandor T. Farkas, Round Rock, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1394 days.

(21) Appl. No.: 11/176,989

(22) Filed: Jul. 8, 2005

(65) Prior Publication Data
US 2007/0011383 A1    Jan. 11, 2007

(51) Int. Cl.
*H05K 7/00* (2006.01)
*G06F 3/00* (2006.01)
*G06F 13/40* (2006.01)

(52) U.S. Cl.
USPC ............................. 710/301; 710/36; 710/305

(58) Field of Classification Search
USPC .................... 710/300–302, 36, 305, 306, 316
See application file for complete search history.

(56) References Cited

U.S. PATENT DOCUMENTS

| | | | | |
|---|---|---|---|---|
| 2005/0240703 | A1* | 10/2005 | Nguyen et al. | 710/301 |
| 2006/0098020 | A1* | 5/2006 | Shen et al. | 345/520 |
| 2006/0271713 | A1* | 11/2006 | Xie et al. | 710/100 |

* cited by examiner

*Primary Examiner* — Tim T Vo
*Assistant Examiner* — Trisha Vu
(74) *Attorney, Agent, or Firm* — Baker Botts L.L.P.

(57) ABSTRACT

A system and method for configuring expansion bus links to generate a double-bandwidth link slot are disclosed. An information handling system includes a central processing unit (CPU) and memory operable to store program instructions executable by the CPU. A chip set operably couples the CPU and the memory to a first slot and a second slot. The chipset includes a root port that generates a first link coupled to the first slot and a second link coupled to the second slot. An adapter card is inserted into either of the first or second slots such that the adapter card routes either the first or second link to the slot not populated by the adapter card.

19 Claims, 2 Drawing Sheets

SYSTEM AND METHOD FOR CONFIGURING EXPANSION BUS LINKS TO GENERATE A DOUBLE-BANDWIDTH LINK SLOT

TECHNICAL FIELD

The present disclosure relates in general to information handling systems, and more particularly to a system and method for configuring expansion bus links to generate a double-bandwidth link slot.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, information handling systems, such as servers, use an increasing number of input/output (I/O) expansion cards and/or require the expansion cards to operate at faster speeds. As computing and power requirements continue to increase, users are looking for ways to pack more computing power into smaller spaces while at the same time saving money, conserving energy, and having flexibility. Today, many systems support the use of a PCI Express (PCIe) bus that provides links from one or more I/O devices to the chipset and/or processor of the system. In order to support the bandwidth demands of current and future expansion cards, a system may provision multi-lane PCIe links to one or more I/O devices. In current systems, the links may be 4-lanes (x4), 8-lanes (x8) and/or 16-lanes (x16) wide and each lane may provide a raw bandwidth of approximately 2 Gb/s per direction. Although many conventional expansion cards may operate at full bandwidth on x4 links, some current and future expansion cards may require x8 links (or higher) to realize full performance. The technologies that require higher bandwidth may include 8-port RAID/SAS, 2-port x4 InfiniBand, 10 gE/TOE, 10 g Fibre Channel and other 10-40 Gbit technologies.

However, the number of provisioned links and associated lanes available from the chipset may force system designers to choose between the total number of PCIe slots and the number of high bandwidth slots supported by the system. For example, a specific chipset may support two x8 root ports that generate two x8 links. The links may be used to support two x8 devices, one x8 device and two x4 devices, or four x4 devices. The system designer, therefore, must determine whether to design a system having a higher number of I/O devices operating at a lower bandwidth or a lower number of I/O devices operating at a higher bandwidth.

Current solutions for providing flexibility in a system with respect to the number of slots include PCIe switches that may be used to fan-out a single root port to multiple peripheral devices. For example, a single x8 root point may be fanned out into three x8 links. However, PCIe switches require extra circuitry to implement, introduce routing complexity into the motherboard, increase the cost of the system, require more power to operate and add additional latency to the PCIe bus such that bandwidth bottlenecking may occur. PCIe switches, therefore, may be undesirable, especially in low-cost systems.

SUMMARY

In accordance with the present disclosure, the disadvantages and problems associated with configuring slots in an information handling system have been substantially reduced or eliminated. In a particular embodiment, an adapter card inserted into either a first or second slots routes either a first link or a second link of an expansion bus to the slot not populated by the adapter card.

In accordance with one embodiment of the present disclosure, an information handling system includes a central processing unit (CPU) and memory that stores program instructions executable by the CPU. A chip set operably couples the CPU and the memory to a first slot and a second slot. The chipset includes a root port that generates a first link coupled to the first slot and a second link coupled to the second slot. An adapter card is inserted into either of the first or second slots such that the adapter card routes either the first or second link to the slot not populated by the adapter card.

In accordance with another embodiment of the present disclosure, circuitry for configuring expansion bus links to generate a double-bandwidth link slot includes a root port provided by a chipset that generates a first link to couple the root port to a first slot and a second link to couple the root port to a second slot. An adapter card is inserted into either of the first or second slots such that the adapter card routes either the first or second link to the slot not populated by the adapter card.

In accordance with a further embodiment of the present disclosure, circuitry for configuring PCIe links to generate a double-bandwidth link slot includes a root port provided by a chipset that generates a first PCIe link to couple the root port to a first slot and a second PCIe link to couple the root port to a second slot. A plurality of electrical connections couples the first slot to the second slot. An adapter card is inserted into either of the first or second slots such that the adapter card routes either the first or second link to the slot not populated by the adapter card by using the electrical connections.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
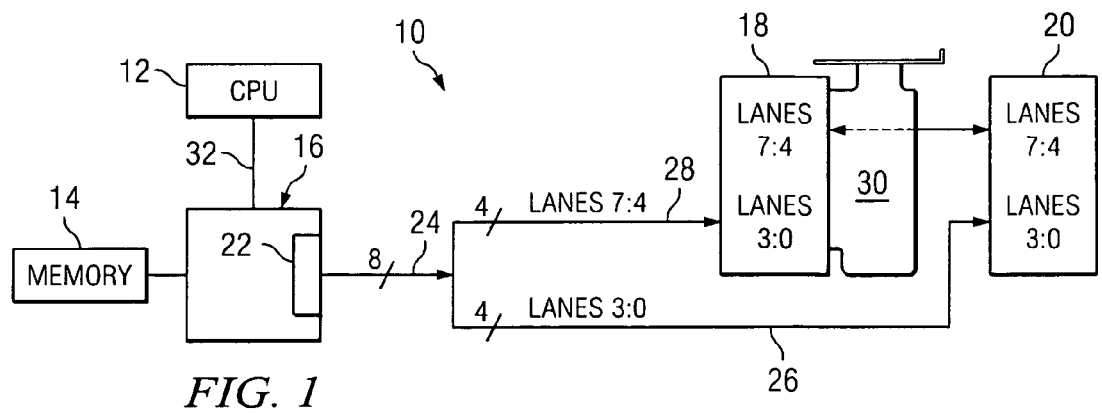
FIG. 1 illustrates a block diagram of an information handling system including I/O expansion slots in accordance with teachings of the present disclosure.

Preferred embodiments and their advantages are best understood by reference to FIGS. 1 through 4, wherein like numbers are used to indicate like and corresponding parts.

A conventional information handling system may include an expansion bus, such as a PCI Express (PCIe) bus, that allows input/output (I/O) devices to communicate with the system processor, chipset and memory. The PCIe bus may be generated by one or more root ports provided by the chipset. Each root port may generate one or more PCIe links that are routed on a motherboard to the I/O devices. Due to factors such as package size, die size, cost and complexity, a limited number of PCIe root ports and links may be provided by the chipset. Motherboard designers, therefore, must choose between designing a system that includes the maximum number of slots supported by the chipset, where each slot provides a low bandwidth connection for each installed expansion card and a system that includes fewer slots, where each slot provides a high bandwidth connection for each installed expansion card. This choice must be made because the routing connections from the chipset to the peripheral devices in the motherboard cannot be altered once the motherboard has been manufactured.

The present disclosure provides a system and method for configuring PCIe links to generate a double-bandwidth link slot from single-bandwidth link slots such that the system may be configured by a user to support both low and high bandwidth expansion cards. A chipset in an information handling system may include a root port that generates a PCIe link including a plurality of lanes. The PCIe link may be bifurcated by the root port to generate two PCIe links that each have half the number of lanes as the single PCIe link generated by the root port. Each bifurcated PCIe link may be coupled to a slot that supports an expansion card capable of operating at a bandwidth supported by the single PCIe link. When the I/O device is inserted into the slot, however, the device will operate at a lower bandwidth because the PCIe link is bifurcated into two lower bandwidth links.

In this configuration, each slot may include unused lanes, e.g., lanes that are not coupled to the root port. The slots may be coupled together by swizzled electrical connections between the unused lanes of each slot such that any connection does not start and end on the same lane. When an adapter card is inserted into one of the slots, the adapter card may function to couple both bifurcated PCIe links to the unpopulated slot. An expansion card inserted into the unpopulated slot, therefore, may operate at a higher bandwidth because all lanes of the single PCIe link generated by the root port of the chipset are coupled to the slot populated by the expansion card. The adapter card, therefore, provides a low cost technique to flexibly provision the slots to allow for systems that require either a larger number of low bandwidth slots or a smaller number of high bandwidth slots.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, a server, or any other suitable device and may vary in size, shape, performance, functionality, and price. The information handling system may include random access memory (RAM), one or more processing resources such as a central processing unit (CPU) or hardware or software control logic, read only memory (ROM), and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a block diagram of information handling system 10. In the illustrated embodiment, information handling system 10 includes central processing unit (CPU) 12, memory 14, chipset 16 and I/O expansion slots 18 and 20. Chipset 16 may include root port 22 that generates PCI Express (PCIe) link 24 such that CPU 12 may communicate with any I/O devices inserted in slots 18 and 20. As described in more detail below, chipset 16 may support bifurcation of PCIe link 24 to create PCIe links 26 and 28. PCIe link 26 may be coupled to slot 20 and PCIe link 28 may be coupled to slot 18. Additionally, slots 18 and 20 may be coupled together by swizzled electrical connections (not expressly shown). An adapter card 30 may be inserted into either of slots 18 and 20 such that both of PCIe links 26 and 28 (e.g., PCIe link 24) are coupled to the unpopulated slot. Adapter card 30, therefore, may allow the user to provision slots 18 and 20 to support devices having both high and low bandwidth capabilities.

CPU 12 may be a microprocessor, a microcontroller, a digital signal processor (DSP) or any other digital or analog circuitry configured to execute processing instructions stored in memory 14. For example, the processing instructions may include an operating including Basic Input/Output System (BIOS) programming. Memory 14 may be random access memory (RAM), electrically erasable programmable read-only memory (EEPROM), a PCMCIA card, flash memory, or any suitable selection and/or array of volatile or non-volatile memory. CPU 12 and may communicate with chipset 16 through front side bus 32.

Chipset 16 may be used to connect CPU 12 to memory 14 and PCIe bus 24. Chipset 16 may include root port 22 that generates PCIe link 24, which provides point-to-point communication between I/O devices inserted into slots 18 and/or 20 and CPU 12. Each lane of PCIe link 24 may include two, low-voltage, differential pairs—a transmit pair and a receive pair—that provide a dual simplex serial connection between two devices (e.g., chipset 16 and slots 18 and 20). Data transmission between the two devices, therefore, may occur simultaneously in both directions. A single lane link may be referred to as having a x1 width. To scale the bandwidth of PCIe Link 24, multiple lanes may be aggregated to generate a link having a specific bandwidth. For example, a link having a x8 width may provide an aggregate bandwidth of approximately 20 Gbits/s of raw bandwidth in each direction (e.g., receive and transmit). In other embodiments, the raw bandwidth for an x8 link may be higher or lower depending on the technology used for chipset 16. Although, PCIe link 24 is described as having a certain link width, PCIe link 24 may have any suitable link width including, but not limited to, x1, x2, x8, x16, x24 and x32, where the bandwidth supported by PCIe link 24 corresponds to the number of lanes.

In the illustrated embodiment, root port 22 generates PCIe link 24, which has an x8 link width. Additionally, root port 22 may support bifurcation such that PCIe link 24 is split into two links (e.g., PCIe links 26 and 28) that have link widths equal to half the link width for PCIe link 24. In the illustrated embodiment, PCIe links 26 and 28 have x4 link widths. PCIe link 26 may be generated from lower lanes [3:0] of PCIe link 24 and PCIe link 28 may be generated from upper lanes [7:4] of PCIe link 24. The bifurcated links may be used to couple root port 22 of chipset 16 to slots 18 and 20 such that chipset 16 provides communication between CPU 12 and memory 14 and any I/O devices inserted in slots 18 and/or 20.

Slots 18 and 20 may represent physical locations, typically within the computer chassis of system 10, where expansion cards for various I/O devices may be installed. Devices that may be inserted into slots 18 and 20 include, but are not limited to, a graphics card, a storage controller card, a network adapter card and a communication card. In other embodiments, system 10 may have one or more chip connections to I/O devices in addition to or instead of slot connections.

In the illustrated embodiment, PCIe link 26 may couple root port 22 of chipset 16 to slot 20 and PCIe link 28 may couple root port 22 of chipset 16 to slot 18. Slots 18 and 20 may be configured with a link width equal to the link width of PCIe link 24 generated by root port 22. For example, slots 18 and 20 may have a x8 link width in the illustrated embodiment. PCIe link 26 may be coupled to lower lanes [3:0] of slot 20 and PCIe link 28 may be coupled to lower lanes [3:0] of slot 18. Upper lanes [7:4] of slots 18 and 20, therefore, may be unused such that upper lanes [7:4] are not coupled to root port 22 of chipset 16.

Although devices that operate at a bandwidth supported by PCIe link 24 may be inserted into both of slots 18 and 20, the devices will operate at a lower bandwidth because PCIe links 26 and 28 support communication at the lower bandwidth due to the decreased number of lanes included in PCIe links 26 and 28. Either of slots 18 and/or 20, however, may additionally be configured as a double-bandwidth slot (e.g., the bandwidth supported by PCIe link 24) by inserting adapter card 30 into one of slots 18 and/or 20 such that a device inserted into the slot not populated by adapter card 30 may operate at the higher bandwidth provided by PCIe link 24. Adapter card 30, therefore, provides a low cost technique for allowing a user to configure information handling system 10 to include an increased number of lower bandwidth slots or a decreased number of high bandwidth slots.

In the illustrated embodiment, adapter card 30 is inserted in slot 18 and slot 20 is unpopulated. Adapter card 30 may include electrical connections that couple lower lanes [3:0] of slot 18 to upper lanes [7:4] of slot 18. As described above, upper lanes [7:4] of slots 18 and 20 may be unused such that upper lanes [7:4] are not be coupled to root port 22 of chipset 16 through PCIe link 24. Upper lanes [7:4] of slots 18 and 20, however, may be coupled together by swizzled electrical connections (not expressly shown). When adapter card 30 is inserted into slot 18, the electrical connections on adapter card 30 may couple PCIe link 28 to upper lanes [7:4] of slot 20 such that all lanes of PCIe link 24 are coupled to slot 20. Slot 20, therefore, may allow a device inserted into slot 20 to operate at a higher bandwidth, e.g., the bandwidth supported by PCIe link 24. Use of adapter card 30 combined with the swizzled electrical connections allows a user to configure system 10 to support an increased number of low bandwidth devices or a decreased number of high bandwidth devices.

Although FIG. 1 illustrates information handling system 10 that includes certain components, system 10 may be configured in other ways. For example, chipset 16 may include more than one root port where each root port generates a separate PCIe link that provides communication between chipset 16, CPU 12, memory 14 and any devices included in system 10. Additionally, root port 22 may generate PCIe link 24 that includes any link width (e.g., x1, x2, x4, x16, x24 and x32) supported by chipset 16 and may bifurcate PCIe link 24 to include two links that have a link width of half the original width (e.g., two x1 links for a x2 link width, two x2 links for a x4 link width, two x4 links for a x8 link width, two x8 links for a x16 link width and two x16 links for a x32 link width). Further, system 10 may include any number of slot configurations that may be possible depending on the desired scaling (x1, x2, x4, x8, x16, etc.) of the links. Finally, root port 22 may be used to generate any type of expansion bus that utilizes links to communicate data between devices.

Figure 2:
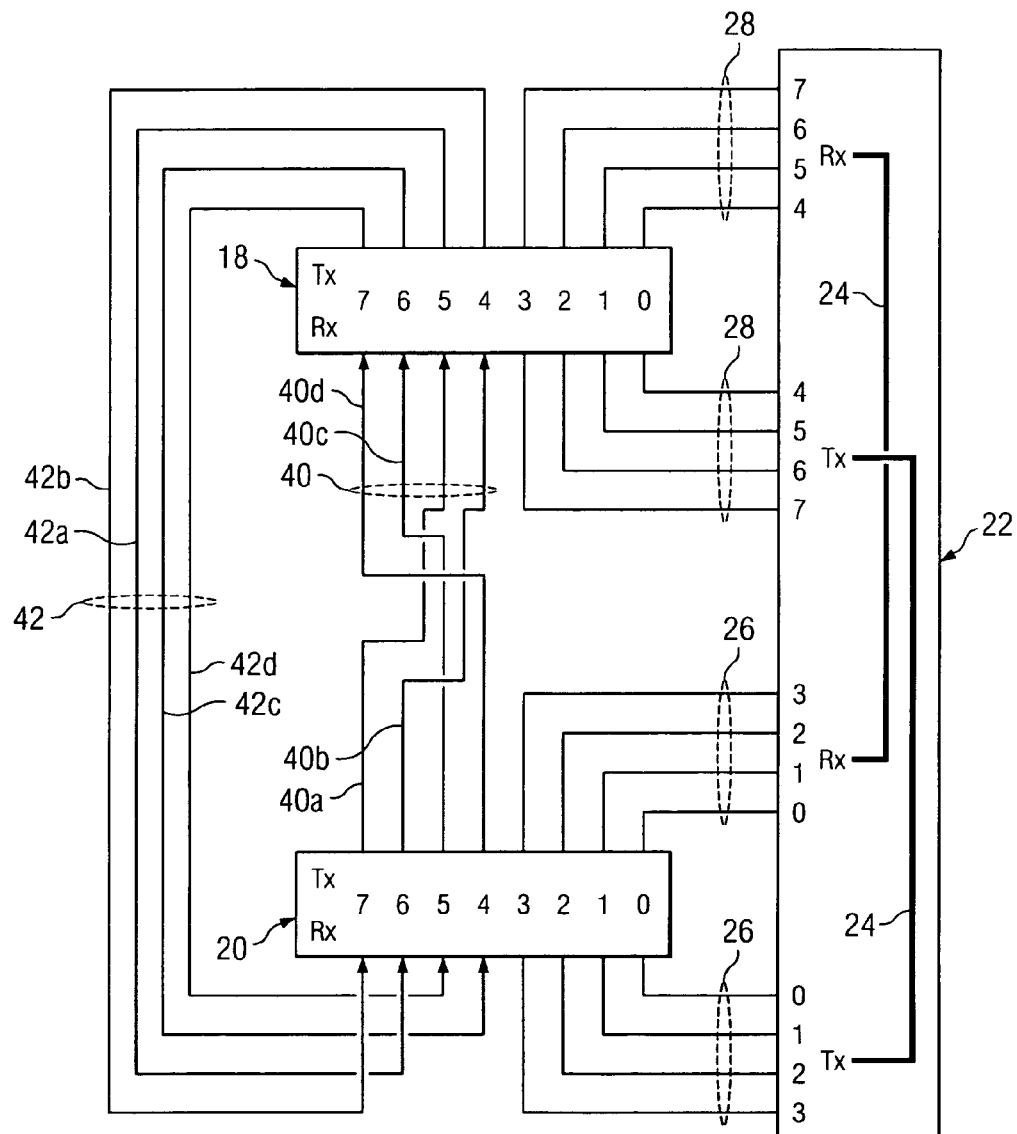
FIG. 2 illustrates a schematic view of an example embodiment of a technique for routing a PCI Express (PCIe) link between expansion slots in an information handling system in accordance with teachings of the present disclosure.

FIG. 2 illustrates a schematic diagram of electrical connections for routing a PCIe link between slots 18 and 20 in information handling system 10. Chipset 16 may include root port 22 configured to generate PCIe link 24. In the illustrated embodiment, root port 22 is configured to bifurcate PCIe link 24, which has a x8 link width, into PCIe links 26 and 28, which each have x4 link widths. In other embodiments, root port 22 may be configured to generate a single link having any suitable link width or a bifurcated link having any suitable link width. Each of PCIe links 26 and 28 is illustrated as two pairs of signals—a transmit pair and a receive pair. Transmit pairs are identified as T signals and receive pairs as R signals.

PCIe link 24 may includes eight lanes as indicated by lanes [7:0], where each lane has a transmit lane (Tx) and a corresponding receive lane (Rx). Transmit lanes [3:0] and receive lanes [3:0] of PCIe link 24 may form PCIe link 26 and transmit lanes [7:4] and receive lanes [7:4] of PCIe link 24 may form PCIe link 28. Slots 18 and 20 may have a link width equal to the link width of PCIe link 24 (e.g., a x8 width as illustrated in FIG. 2) and may have both receive and transmit lanes. Transmit lanes of PCIe link 26 may be coupled to lower receive lanes [3:0] of slot 20 and receive lanes of PCIe link 26 may be coupled to lower transmit lanes [3:0] of slot 20. Additionally, transmit lanes of PCIe link 28 may be coupled to lower receive lanes [3:0] of slot 18 and receive lanes of PCIe link 28 may be coupled to lower transmit lanes [3:0] of slot 18. Upper transmit lanes [7:4] and upper receive lanes [7:4] may be unused such that upper lanes [7:4] of slots 18 and 20 are not coupled to root port 22 of chipset 16.

Upper lanes [7:4] of slots 18 and 20 may be coupled together by electrical connections 40 and 42. In one embodiment, electrical connections 40 and 42 may be metal wires routed in a printed circuit board (PCB) such as a motherboard on which CPU 12, memory 14, chipset 16 and slots 18 and 20 are mounted on in information handling system 10. Electrical connections 40 and 42 may be "swizzled" such that each of electrical connections 40 is routed from one transmit lane of slot 20 to another receive lane of slot 18 and each of electrical connections 42 is routed from one transmit lane of slot 18 to another receive lane of slot 20. For example, electrical connections 40 and 42 may be routed between slots 18 and 20 as described in Table 1.

TABLE 1

| Electrical connections 40 | Slot 20 to Slot 18 | | Electrical connections 42 | Slot 18 to Slot 20 | |
|---|---|---|---|---|---|
| | Slot 20 Tx | Slot 18 Rx | | Slot 18 Tx | Slot 20 Rx |
| 40a | Lane 7 | Lane 5 | 42a | Lane 5 | Lane 6 |
| 40b | Lane 6 | Lane 4 | 42b | Lane 4 | Lane 7 |
| 40c | Lane 5 | Lane 6 | 42c | Lane 6 | Lane 4 |
| 40d | Lane 4 | Lane 7 | 42d | Lane 7 | Lane 5 |

Using electrical connection 40a as an example, electrical connection 40a starts on transmit lane [7] of slot 20 and ends on receive lane [5] of slot 18 and electrical connection 42a starts on transmit lane [5] of slot 18 and ends on receive lane [6] of slot 20. Electrical connections 40a and 42a, therefore, do not start and end on the same lane. By routing each of electrical connections 40 and 42 such that a link between slots 18 and 20 starts on one transmit lane and ends on different receive lane, upper lanes [7:4] of slots 18 and 20 will not be configured into links, either to root port 22 or slots 18 and 20, when a x8 device is installed in both of slots 18 and 20.

During initialization or when a PCIe reset occurs, PCIe links 26 and 28 may be detected, polled and configured in accordance with the Link Training and Status State Machine (LTSSM) described in the PCIe Base Specification. The "detect" phase determines on a lane-by-lane basis if a receiver termination is detected by each transmitter on the downstream and upstream ports. The "polling" phase determines on a lane-by-lane basis if each lane is able to reliably transmit and receive encoded control messages. The "configuration" phase determines which lanes, as determined in the polling phase, may be joined together to form a link and if more than one link can be formed from the available lanes (e.g., bifurcation"). During the configuration phase, a link is formed if a training sequence may be communicated between the transmit and receive lanes of root port 22 for a single numbered lane. In the illustrated embodiment, links 26 and 28 may be properly formed because each transmit lane is linked to a corresponding receive lane of PCIe link 24. In contrast, electrical connections 40 and 42 may not be configured as links because each transmit lane of slots 18 and 20 is not coupled to the corresponding receive lane. The swizzling of electrical connections 40 and 42, therefore, ensure that upper lanes [7:4] of slots 18 and 20 fail the configuration phase such that no link is formed between upper lanes [7:4] of slots 18 and 20.

In one embodiment, a x8 expansion card may be inserted into slot 18 and slot 20 may remain unpopulated. During the configuration phase, lanes [7:4] of the x8 expansion card will fail configuration due to the swizzling of electrical connections 40 and 42 such that slot 18 is configured as a x4 slot with lower lanes [3:0] coupled to root port 22. The x8 expansion card, therefore, effectively operates at a x4 bandwidth. In another embodiment, the x8 expansion card may be inserted into slot 20 and adapter card 30 may be inserted into slot 18. Adapter card 30 may effectively couple lower lanes [3:0] of slot 18 to upper lanes [7:4] slot 18 and provide the connections (as explained in more detailed with respect to FIG. 3) to unswizzle electrical connections 40 and 42 such that the upper lanes [7:4] of slots 18 and 20 are coupled together. Both of links 26 and 28, therefore, may be coupled to slot 20 such that lanes [7:0] of the x8 expansion card pass the configuration phase to allow the expansion card to operate at the full x8 bandwidth.

Figure 3:
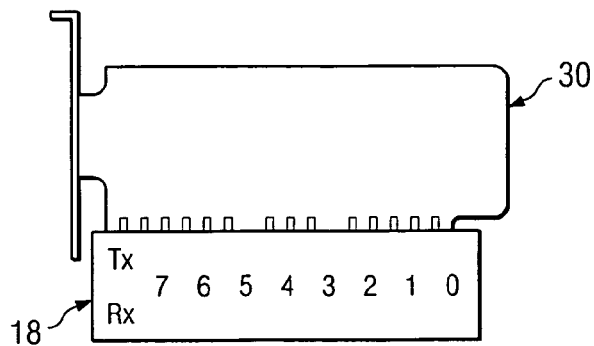
FIG. 3 illustrates a front view of an adaptor card that provisions PCIe links to expansion slots of an information handling system in accordance with teachings of the present disclosure.

FIG. 3 illustrates a front view of adapter card 30 used to provision PCIe links 26 and 28 to slots 18 and 20 of information handling system 10. In the illustrated embodiment, adapter card 30 includes connections that unswizzle electrical connections 40 and 42 to effectively couple upper lanes [7:4] of slot 18 to upper lanes [7:4] of slot 20. In one embodiment, adapter card 30 may be a passive, etch only PCB that includes metal wires etched into the PCB to connect lower lanes [3:0] of slot 18 to upper lanes [7:4] of slot 18 and unswizzle electrical connections 40 and 42. In another embodiment, adapter card may be a PCB that includes an active component to provide the connections between lower lanes [3:0] and upper lanes [7:4] of slot 18. In one embodiment, adapter card 30 may be the same size as a standard PCIe expansion card. In another embodiment, adapter card 30 may be the size of a memory DIMM. In other embodiments, adapter card 30 may be any suitable size such that adapter card 30 may be inserted into slots 18 and 20.

As illustrated in FIG. 1, adapter card 30 may be inserted into slot 18 such that link 28 may be routed to upper lanes [7:4] of slot 20. As described with respect to FIG. 2, electrical connections 40 and 42 may be swizzled in a particular way in order to prevent a link from being created between slots 18 and 20 during the configuration phase. The connections on adapter card 30 may unswizzle electrical connections 40 and 42 to couple link 28 to upper lanes [7:4] of slot 20. For example, if electrical connections were swizzled as described in reference to FIG. 2, adapter card 30 would include the connections between the receive (Rx) and transmit (Tx) lanes of slot 18 as shown in Table 2.

TABLE 2

| Link 26 to Slot 20 Rx | | Link 26 to Slot 20 Tx | |
|---|---|---|---|
| Slot 18 Rx | Slot 18 Tx | Slot 18 Tx | Slot 18 Rx |
| Lane 3 | Lane 4 | Lane 3 | Lane 5 |
| Lane 2 | Lane 5 | Lane 2 | Lane 4 |
| Lane 1 | Lane 7 | Lane 1 | Lane 6 |
| Lane 0 | Lane 6 | Lane 0 | Lane 7 |

The above connections between Rx lanes [3:0] and Tx lanes [7:4] effectively couple transmit lanes of PCIe link 28 to upper receive lanes [7:4] of slot 20. Additionally, the connections between Tx lanes [3:0] and Rx lanes [7:4] effective couple receive lanes of PCIe link 28 to the upper transmit lanes [7:4] of slot 20. Therefore, when a x8 expansion card is inserted into slot 20 and adapter card 30 is inserted into slot 18, links 26 and 28 may be coupled to slot 20 such that the expansion card operates at a bandwidth provided by a x8 link width.

Although a specific configuration is described for adapter card 30 with respect to FIG. 3, adapter card 30 may be configured in other ways. For example, adapter card 30 may be inserted into slot 20 such that link 26 is coupled to upper lanes [7:4] of slot 18. Additionally, adapter card 30 may include any suitable connections that effectively unswizzle electrical connections 40 and 42 in order to couple upper lanes [7:4] of slot 18 to upper lanes [7:4] of slot 20.

Figure 4:
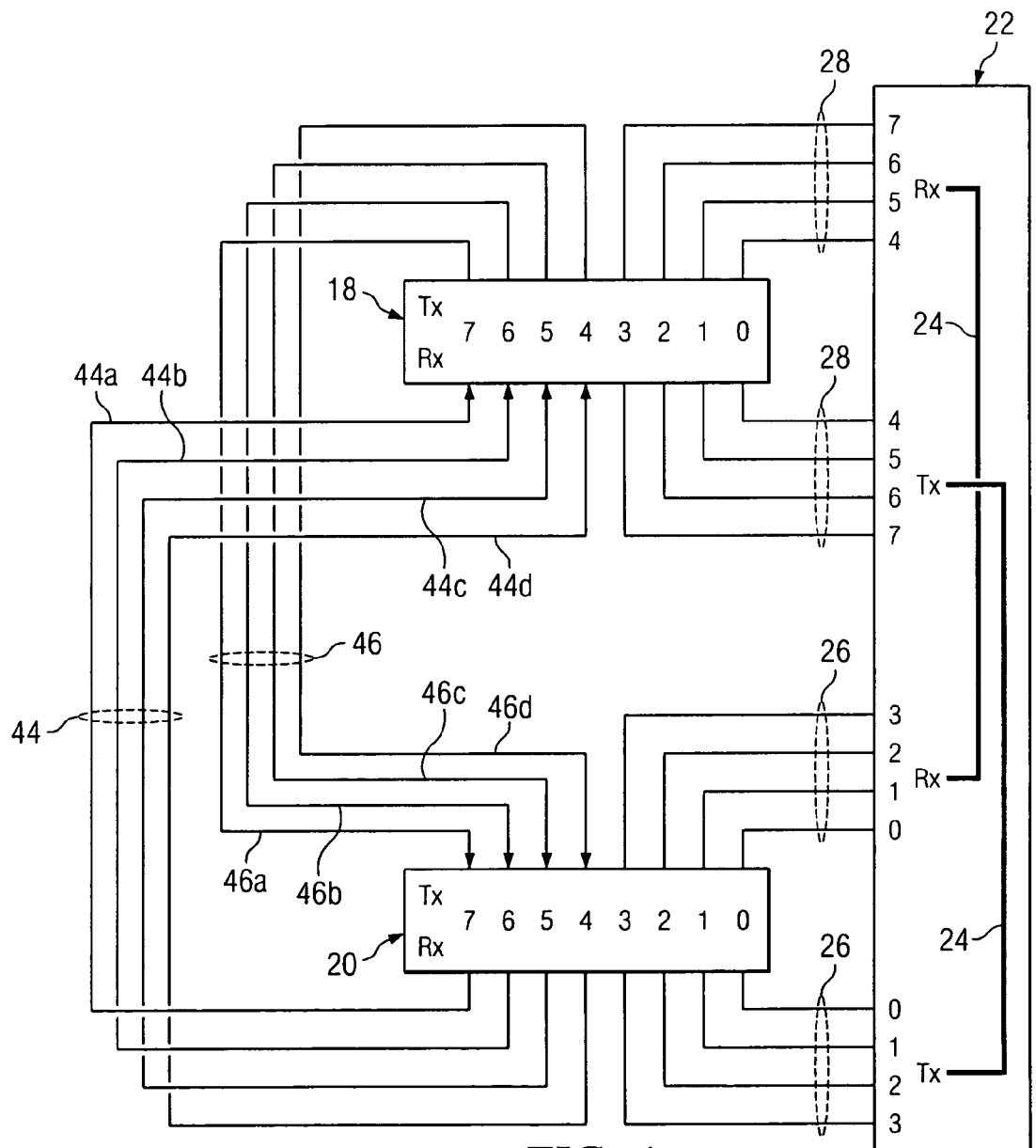
FIG. 4 illustrates a schematic view of another example embodiment of a technique for routing a PCIe link between expansion slots in an information handling system in accordance with teachings of the present disclosure.

FIG. 4 illustrates a schematic diagram of another example embodiment of electrical connections for routing a PCIe link between slots 18 and 20 in information handling system 10. Similar to the embodiment illustrated in FIG. 2, PCIe link 24 may have a x8 width and may be bifurcated into PCIe links 26 and 28, which each have a x4 width. PCIe link 26 may be coupled to lower lanes [3:0] of slot 20 and PCIe link 28 may be coupled to lower lanes [3:0] of slot 18. PCIe links 26 and 28 may be respectively coupled to the transmit and receive lanes of slots 20 and 18 as described with respect to FIG. 2. Upper transmit lanes [7:4] and upper receive lanes [7:4] may be unused such that upper lanes [7:4] of slots 18 and 20 are not coupled to root port 22 of chipset 16.

Upper lanes [7:4] of slots 18 and 20 may be coupled together by electrical connections 44 and 46. In one embodiment, electrical connections 44 and 46 may be metal wires routed in a printed circuit board (PCB) such as a motherboard on which CPU 12, memory 14, chipset 16 and slots 18 and 20 are mounted on in information handling system 10. Electrical connections 44 and 46 may be "swizzled" such that each of electrical connections 44 is routed from one receive lane of slot 20 to the same receive lane of slot 18 and each of electrical connections 46 is routed from one transmit lane of slot 18 to the same transmit lane of slot 20. For example, electrical connections 44 and 46 may be routed between slots 18 and 20 as described in Table 3.

TABLE 3

| Electrical connections | Slot 20 to Slot 18 | | Electrical connections | Slot 18 to Slot 20 | |
|---|---|---|---|---|---|
| | Slot 20 Rx | Slot 18 Rx | | Slot 18 Tx | Slot 20 Tx |
| 44a | Lane 7 | Lane 7 | 46a | Lane 7 | Lane 7 |
| 44b | Lane 6 | Lane 6 | 46b | Lane 6 | Lane 6 |
| 44c | Lane 5 | Lane 5 | 46c | Lane 5 | Lane 5 |
| 44d | Lane 4 | Lane 4 | 46d | Lane 4 | Lane 4 |

Because the transmit lanes of slot 18 are coupled to the transmit lanes of slot 20 and the receive lanes of slot 20 are coupled to the receive lanes of slot 18, no links will be formed between slots 18 and 20 during the configuration phase. In other embodiments, any suitable lane routings for electrical connections 44 and 46 may be used such that the transmit lanes of slots 18 and 20 are coupled together and the receive lanes of slots 18 and 20 are coupled together. The routings ensure the upper lanes [7:4] of slots 18 and 20 will not be configured into links, either to root port 22 of chipset 16 or slots 18 and 20, when a x8 card is installed in both of slots 18 and 20.

In one embodiment, a x8 expansion card may be inserted into slot 18 and slot 20 may remain unpopulated. During the configuration phase, lanes [7:4] of the x8 expansion card will fail configuration due to the swizzling of electrical connections 44 and 46 such that slot 18 is configured as a x4 port with lower lanes [3:0] coupled to root port 22 of chipset 16. The x8 expansion card, therefore, effectively operates at a x4 bandwidth. In another embodiment, the x8 expansion card may be inserted into slot 20 and adapter card 30 may be inserted into slot 18. Adapter card 30 may effectively couple lower lanes [3:0] of slot 18 to upper lanes [7:4] slot 18 and provide the connections needed to unswizzle electrical connections 44 and 46 such that the upper lanes [7:4] of slots 18 and 20 are coupled together. Both of links 26 and 28, therefore, may be coupled to slot 20 such that lanes [7:0] of the x8 expansion card pass the configuration phase to allow the expansion card to operate at the full x8 bandwidth. Table 4 shows the connections on adapter card 30 that may unswizzle electrical connections 44 and 46.

TABLE 4

| Link 26 to Slot 20 Rx | | Link 26 to Slot 20 Tx | |
|---|---|---|---|
| Slot 18 Rx | Slot 18 Rx | Slot 18 Tx | Slot 18 Tx |
| Lane 3 | Lane 7 | Lane 3 | Lane 7 |
| Lane 2 | Lane 6 | Lane 2 | Lane 6 |
| Lane 1 | Lane 5 | Lane 1 | Lane 5 |
| Lane 0 | Lane 4 | Lane 0 | Lane 4 |

The above connections between Rx lanes [3:0] and Rx lanes [7:4] effectively couple PCIe link 28 to upper receive lanes [7:4] of slot 20. Additionally, the connections between Tx lanes [3:0] and Tx lanes [7:4] effectively couple PCIe link 28 to upper transmit lanes [7:4] of slot 20. Therefore, when a x8 expansion card is inserted into slot 20 and when adapter card 30 is inserted into slot 18, links 26 and 28 may be coupled to slot 20 such that slot 20 supports x8 devices.

Although the present disclosure as illustrated by the above embodiments has been described in detail, numerous variations will be apparent to one skilled in the art. For example, information handling system 10 may include any number of slots having any width (e.g., x1, x2, x4, x8, x12, x16, and x32) supported by chipset 16. In one embodiment, PCIe link 24 may have a x16 link width and PCIe links 26 and 28 may have x8 link widths. PCIe links 26 and 28 may be routed to lower lanes [7:0] of slots 18 and 20 and upper lanes [15:8] of slots 18 and 20 may be coupled together by swizzled electrical connections. When adapter card 30 is inserted in either of slots 18 or 20, adapter card 30 may unswizzle the electrical connections such that an expansion card inserted into the slot not populated by adapter card 30 will operate at a x16 bandwidth. Additionally, electrical connections between the upper lanes [15:8] of the slots may be swizzled in any manner that prevents links from being formed during a configuration phase when the slots are empty or populated with expansion cards. Further, adapter card 30 may be any shape or size of card that can be inserted into the slots included in information handling system 10. It should be understood that various changes, substitutions and alternations can be made herein without departing from the spirit and scope of the disclosure as illustrated by the following claims.

What is claimed is:

1. An information handling system, comprising:
a central processing unit (CPU);
memory operable to store program instructions executable by the CPU;
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;
wherein the upper lanes of the first slot and the upper lanes of the second slot are electrically coupled by a plurality of swizzled electrical connections comprising:
a plurality of first connections operable to electrically couple the numbered first upper transmit lanes to the numbered second upper receive lanes, wherein each of the plurality of first connections begins at a numbered first upper transmit lane and ends at a numbered second upper receive lane;

a plurality of second connections operable to electrically couple the numbered second upper transmit lanes to the numbered first upper receive lanes, wherein each of the plurality of second connections begins at a numbered second upper transmit lane and ends at a numbered first upper receive lane; and a plurality of paths, each path comprising:
one of the plurality of first connections, and
one of the plurality of second connections,
wherein the number associated with the end of the first connection is equal to the number associated with the beginning of the second connection,
and wherein the number associated with the end of the second connection is different from the number associated with the beginning of the first connection;

a first expansion card having the same number of lower lanes and upper lanes as the first slot;

a second expansion card having the same number of lower lanes and upper lanes as the first slot;

wherein when the first expansion card and the second expansion card are inserted into the first and second slots, respectively, the plurality of swizzled electrical connections prevent links from being configured between the upper lanes of the first expansion card and the upper lanes of the second expansion card;

a chipset operably coupled to the CPU, the memory and the first and second slots, the chipset including a root port with the same number of lower lanes and upper lanes as the first slot operable to generate a first link coupled to the lower lanes of the first slot and a second link coupled to the lower lanes of the second slot, wherein the first link has half the number of lanes as the first slot and the second link has half the number of lanes as the first slot; and an adapter card comprising the same number of lower lanes and upper lanes as the first slot, wherein when the adaptor card is inserted into either of the first or second slots, the adapter card routes either the first or second link to the slot not populated by the adapter card, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first expansion card.

2. The system of claim 1, wherein the adapter card comprises link connections to electrically couple the first link to the second slot if the adapter card is inserted in the first slot and the second link to the first slot if the adapter card is inserted in the second slot.

3. The system of claim 1, wherein the adapter card comprises link connections operable to unswizzle the swizzled electrical connections.

4. The system of claim 1, wherein the first and second slots comprise at least one of a x4 expansion slot, a x8 expansion slot, a x16 expansion slot and a x32 expansion slot.

5. The system of claim 1, wherein:
the first link comprises a first PCI Express (PCIe) link; and
the second link comprises a second PCIe link.

6. Circuitry for configuring expansion bus links to generate a double-bandwidth link slot, comprising:
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;

wherein the upper lanes of the first slot and the upper lanes of the second slot are electrically coupled by a plurality of swizzled electrical connections comprising:
a plurality of first connections operable to electrically couple the numbered first upper transmit lanes of the first slot to the numbered second upper receive lanes of the second slot, wherein each of the plurality of first connections begins at a numbered first upper transmit lane and ends at a numbered second upper receive lane;

a plurality of second connections operable to electrically couple the numbered second upper transmit lanes of the second slot to the numbered first upper receive lanes of the first slot, wherein each of the plurality of second connections begins at a numbered second upper transmit lane and ends at a numbered first upper receive lane; and a plurality of paths, each path comprising:
one of the plurality of first connections, and
one of the plurality of second connections,
wherein the number associated with the end of the first connection is equal to the number associated with the beginning of the second connection,
and wherein the number associated with the end of the second connection is different from the number associated with the beginning of the first connection;

a first expansion card having the same number of lower lanes and upper lanes as the first slot;

a second expansion card having the same number of lower lanes and upper lanes as the first slot;

a root port provided by a chipset, wherein the root port has the same number of lower lanes and upper lanes as the first slot;

wherein when the first expansion card and the second expansion card are inserted into the first and second slots, respectively, the plurality of swizzled electrical connections prevent links from being configured between the upper lanes of the first expansion card and the upper lanes of the second expansion card;

a first link and a second link generated by the root port of the chipset, the first link operable to couple the root port to the lower lanes of the first slot and the second link operable to couple the root port to the lower lanes of the second slot, wherein the first link has half the number of lanes as the first slot and the second link has half the number of lanes as the first slot; and an adapter card comprising the same number of lower lanes and upper lanes as the first slot, wherein when the adaptor card is inserted into either of the first or second slots, the adapter card routes either the first or second link to the slot not populated by the adapter card, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first expansion card.

7. The circuitry of claim 6, wherein the adapter card comprises link connections to electrically couple the first link to the second slot if the adapter card is inserted in the first slot and the second link to the first slot if the adapter card is inserted in the second slot.

8. The circuitry of claim 6, wherein the adapter card comprises link connections operable to unswizzle the electrical connections.

9. The circuitry of claim 6, wherein:
the first link comprises a first PCI Express (PCIe) link; and
the second link comprises a second PCIe link.

10. Circuitry for configuring PCI Express (PCIe) links to generate a double-bandwidth link slot, comprising:
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;
wherein the upper lanes of the first slot and the upper lanes of the second slot are electrically coupled by a plurality of swizzled electrical connections comprising:
a plurality of first connections operable to electrically couple the numbered first upper transmit lanes of the first slot to the numbered second upper receive lanes of the second slot, wherein each of the plurality of first connections begins at a numbered first upper transmit lane and ends at a numbered second upper receive lane;
a plurality of second connections operable to electrically couple the numbered second upper transmit lanes of the second slot to the numbered first upper receive lanes of the first slot, wherein each of the plurality of second connections begins at a numbered second upper transmit lane and ends at a numbered first upper receive lane; and
a plurality of paths, each path comprising:
one of the plurality of first connections, and
one of the plurality of second connections,
wherein the number associated with the end of the first connection is equal to the number associated with the beginning of the second connection,
and wherein the number associated with the end of the second connection is different from the number associated with the beginning of the first connection;
a first PCIe expansion card having the same number of lower lanes and upper lanes as the first slot;
a second PCIe expansion card having the same number of lower lanes and upper lanes as the first slot;
a root port provided by a chipset, wherein the root port has the same number of lower lanes and upper lanes as the first slot;
wherein when the first PCIe expansion card and the second PCIe expansion card are inserted into the first and second slots, respectively, the plurality of swizzled electrical connections prevent links from being configured between the upper lanes of the first PCIe expansion card and the upper lanes of the second PCIe expansion card;
a first PCIe link and a second PCIe link generated by the root port of the chipset, the first PCIe link operable to couple the root port to the lower lanes of the first slot and the second PCIe link operable to couple the root port to the lower lanes of the second slot, wherein the first PCIe link has half the number of lanes as the first slot and the second PCIe link has half the number of lanes as the first slot; and
an adapter card comprising the same number of lower lanes and upper lanes as the first slot, wherein when the adaptor card is inserted into either of the first or second slots, the adapter card routes either the first or second PCIe link to the slot not populated by the adapter card by using the swizzled electrical connections, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first PCIe expansion card.

11. The circuitry of claim 10, wherein the adapter card comprises link connections to electrically couple the first PCIe link to the second slot if the adapter card is inserted in the first slot and the second PCIe link to the first slot if the adapter card is inserted in the second slot.

12. An information handling system, comprising:
a central processing unit (CPU);
memory operable to store program instructions executable by the CPU;
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;
wherein the upper lanes of the first slot and the upper lanes of the second slot are electrically coupled by a plurality of swizzled electrical connections comprising:
a plurality of first connections operable to electrically couple the numbered first upper transmit lanes of the first slot to the numbered second upper transmit lanes of the second slot; and
a plurality of second connections operable to electrically couple the numbered second upper receive lanes of the second slot to the numbered first upper receive lanes of the first slot;
a first expansion card having the same number of lower lanes and upper lanes as the first slot;
a second expansion card having the same number of lower lanes and upper lanes as the first slot;
wherein when the first expansion card and the second expansion card are inserted into the first and second slots, respectively, the plurality of swizzled electrical connections prevent links from being configured between the upper lanes of the first expansion card and the upper lanes of the second expansion card;
a chipset operably coupled to the CPU, the memory and the first and second slots, the chipset including a root port with the same number of lower lanes and upper lanes as the first slot operable to generate a first link coupled to the lower lanes of the first slot and a second link coupled to the lower lanes of the second slot, wherein the first link has half the number of lanes as the first slot and the second link has half the number of lanes as the first slot; and
an adapter card comprising the same number of lower lanes and upper lanes as the first slot, wherein when the adaptor card is inserted into either of the first or second slots, the adapter card routes either the first or second link to the slot not populated by the adapter card, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first expansion card.

13. The system of claim 12, wherein
the adapter card comprises link connections to electrically couple the first link to the second slot if the adapter card is inserted in the first slot and the second link to the first slot if the adapter card is inserted in the second slot; and
wherein the adapter card comprises link connections operable to unswizzle the swizzled electrical connections.

14. The system of claim 12, wherein the first and second slots comprise at least one of a x4 expansion slot, a x8 expansion slot, a x16 expansion slot and a x32 expansion slot.

15. Circuitry for configuring expansion bus links to generate a double-bandwidth link slot, comprising:
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;
wherein the upper lanes of the first slot and the upper lanes of the second slot are electrically coupled by a plurality of swizzled electrical connections comprising:
a plurality of first connections operable to electrically couple the numbered first upper transmit lanes of the first slot to the numbered second upper transmit lanes of the second slot; and
a plurality of second connections operable to electrically couple the numbered second upper receive lanes of the second slot to the numbered first upper receive lanes of the first slot;
a first expansion card having the same number of lower lanes and upper lanes as the first slot;
a second expansion card having the same number of lower lanes and upper lanes as the first slot;
a root port provided by a chipset, wherein the root port has the same number of lower lanes and upper lanes as the first slot;
wherein when the first expansion card and the second expansion card are inserted into the first and second slots, respectively, the plurality of swizzled electrical connections prevent links from being configured between the upper lanes of the first expansion card and the upper lanes of the second expansion card;
a first link and a second link generated by the root port of the chipset, the first link operable to couple the root port to the lower lanes of the first slot and the second link operable to couple the root port to the lower lanes of the second slot, wherein the first link has half the number of lanes as the first slot and the second link has half the number of lanes as the first slot; and
an adapter card comprising the same number of lower lanes and upper lanes as the first slot, wherein when the adaptor card is inserted into either of the first or second slots, the adapter card routes either the first or second link to the slot not populated by the adapter card, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first expansion card.

16. The circuitry of claim 15, wherein
the adapter card comprises link connections to electrically couple the first link to the second slot if the adapter card is inserted in the first slot and the second link to the first slot if the adapter card is inserted in the second slot; and
wherein the adapter card comprises link connections operable to unswizzle the electrical connections.

17. The circuitry of claim 15, wherein:
the first link comprises a first PCI Express (PCIe) link; and
the second link comprises a second PCIe link.

18. Circuitry for configuring PCI Express (PCIe) links to generate a double-bandwidth link slot, comprising:
a first slot comprising a plurality of lower lanes and upper lanes and a second slot comprising the same number of lower lanes and upper lanes as the first slot, the upper lanes of the first slot comprising a plurality of numbered first upper transmit lanes and a plurality of numbered first upper receive lanes, the upper lanes of the second slot comprising a plurality of numbered second upper transmit lanes and a plurality of numbered second upper receive lanes;
wherein the upper lanes of the first slot and the upper lanes of the second slot are electrically coupled by a plurality of swizzled electrical connections comprising:
a plurality of first connections operable to electrically couple the numbered first upper transmit lanes of the first slot to the numbered second upper transmit lanes of the second slot; and
a plurality of second connections operable to electrically couple the numbered second upper receive lanes of the second slot to the numbered first upper receive lanes of the first slot; and
a first PCIe expansion card having the same number of lower lanes and upper lanes as the first slot;
a second PCIe expansion card having the same number of lower lanes and upper lanes as the first slot;
a root port provided by a chipset, wherein the root port has the same number of lower lanes and upper lanes as the first slot;
wherein when the first PCIe expansion card and the second PCIe expansion card are inserted into the first and second slots, respectively, the plurality of swizzled electrical connections prevent links from being configured between the upper lanes of the first PCIe expansion card and the upper lanes of the second PCIe expansion card;
a first PCIe link and a second PCIe link generated by the root port of the chipset, the first PCIe link operable to couple the root port to the lower lanes of the first slot and the second PCIe link operable to couple the root port to the lower lanes of the second slot, wherein the first PCIe link has half the number of lanes as the first slot and the second PCIe link has half the number of lanes as the first slot; and
an adapter card comprising the same number of lower lanes and upper lanes as the first slot, wherein when the adaptor card is inserted into either of the first or second slots, the adapter card routes either the first or second PCIe link to the slot not populated by the adapter card by using the swizzled electrical connections, and wherein when the adaptor card is inserted into either of the first or second slots and the first expansion card is inserted into the remaining slot of the first or second slots, the adapter card is operable to allow the configuration of links between the upper lanes of the adaptor card and the upper lanes of the first PCIe expansion card.

19. The circuitry of claim 18, wherein
the adapter card comprises link connections to electrically couple the first PCIe link to the second slot if the adapter card is inserted in the first slot and the second PCIe link to the first slot if the adapter card is inserted in the second slot; and
the adapter card comprises link connections operable to unswizzle the swizzled electrical connections.

\* \* \* \* \*